United States Patent
Rice

(10) Patent No.: US 9,004,873 B2
(45) Date of Patent: Apr. 14, 2015

(54) AIRFOIL, TURBOMACHINE AND GAS TURBINE ENGINE

(75) Inventor: Edward Claude Rice, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 765 days.

(21) Appl. No.: 12/978,860

(22) Filed: Dec. 27, 2010

(65) Prior Publication Data

US 2012/0163982 A1    Jun. 28, 2012

(51) Int. Cl.
*F01D 5/14* (2006.01)
*F04D 29/02* (2006.01)
*F04D 29/32* (2006.01)

(52) U.S. Cl.
CPC .............. *F01D 5/147* (2013.01); *F04D 29/023* (2013.01); *F04D 29/324* (2013.01); *F05D 2300/224* (2013.01); *F05D 2300/603* (2013.01); *F05D 2300/612* (2013.01); *Y02T 50/672* (2013.01); *Y02T 50/673* (2013.01)

(58) Field of Classification Search
CPC .............................................. F05D 2300/612
USPC ......................................................... 416/230
See application file for complete search history.

(56) References Cited

U.S. PATENT DOCUMENTS

| | | | |
|---|---|---|---|
| 2,663,928 A * | 12/1953 | Wheeler, Jr. .................... | 29/424 |
| 3,013,641 A | 12/1961 | Compton | |
| 3,529,905 A | 9/1970 | Meginnis | |
| 3,584,972 A | 6/1971 | Bratkovich et al. | |
| 3,619,082 A | 11/1971 | Meginnis | |
| 4,422,229 A | 12/1983 | Sadler et al. | |
| 4,735,841 A * | 4/1988 | Sourdet ......................... | 428/116 |
| 5,352,529 A * | 10/1994 | Scanlon et al. ............... | 428/428 |
| 5,634,771 A | 6/1997 | Howard et al. | |
| 5,672,417 A * | 9/1997 | Champenois et al. ........ | 442/208 |
| 5,720,597 A | 2/1998 | Wang et al. | |
| 6,139,278 A | 10/2000 | Mowbray et al. | |
| 6,443,700 B1 | 9/2002 | Grylls et al. | |
| 6,827,556 B2 * | 12/2004 | Simon ....................... | 416/241 R |
| 6,893,211 B1 | 5/2005 | Eibl et al. | |

(Continued)

FOREIGN PATENT DOCUMENTS

CN        101 078 354 A    11/2007
EP          0 786 580 A2     1/1997

(Continued)

OTHER PUBLICATIONS

Extended European Search Report, EP11 25 0944, Rolls-Royce Corporation, Jun. 6, 2013.

(Continued)

*Primary Examiner* — Nathaniel Wiehe
*Assistant Examiner* — Brian O Peters
(74) *Attorney, Agent, or Firm* — Krieg DeVault LLP

(57) ABSTRACT

One embodiment of the present invention is a unique airfoil for a turbomachine. Another embodiment is a unique gas turbine engine. Yet another embodiment is a method for manufacturing an airfoil for a turbomachine. Other embodiments include apparatuses, systems, devices, hardware, methods, and combinations for airfoils and turbomachinery. Further embodiments, forms, features, aspects, benefits, and advantages of the present application will become apparent from the description and figures provided herewith.

18 Claims, 3 Drawing Sheets

(56) References Cited

U.S. PATENT DOCUMENTS

| | | |
|---|---|---|
| 7,189,064 B2 | 3/2007 | Helder et al. |
| 7,229,254 B2 * | 6/2007 | Bast et al. ............... 416/229 A |
| 7,753,654 B2 * | 7/2010 | Read et al. ............... 416/229 R |
| 7,780,420 B1 * | 8/2010 | Matheny ................ 416/241 R |
| 2005/0186082 A1 * | 8/2005 | Kayser et al. ........... 416/241 R |
| 2005/0201860 A1 * | 9/2005 | Care ........................ 415/173.3 |
| 2006/0251515 A1 * | 11/2006 | Landis ...................... 416/97 R |
| 2007/0036658 A1 | 2/2007 | Morris |
| 2007/0065291 A1 * | 3/2007 | Karafillis ..................... 416/224 |
| 2009/0053068 A1 * | 2/2009 | Hardwicke et al. ....... 416/241 R |
| 2009/0317238 A1 * | 12/2009 | Wood et al. ................. 415/119 |

FOREIGN PATENT DOCUMENTS

| | | |
|---|---|---|
| EP | 1 593 757 A1 | 5/2005 |
| EP | 1 860 084 A1 | 5/2007 |
| EP | 1 908 920 A2 | 9/2007 |

OTHER PUBLICATIONS

Machine Translation of Specification, CN 101 078 354 A.

Machine Translation of Claims, CN 101 078 354 A.

Abstract of CN 101 078 354 A.

* cited by examiner

AIRFOIL, TURBOMACHINE AND GAS TURBINE ENGINE

FIELD OF THE INVENTION

The present invention relates to airfoils, and more particularly, to airfoils for gas turbine engines and other turbomachines.

BACKGROUND

Airfoils for gas turbine engines and other turbomachines remain an area of interest. Some existing systems have various shortcomings, drawbacks, and disadvantages relative to certain applications. Accordingly, there remains a need for further contributions in this area of technology.

SUMMARY

One embodiment of the present invention is a unique airfoil for a turbomachine. Another embodiment is a unique gas turbine engine. Yet another embodiment is a method for manufacturing an airfoil for a turbomachine. Other embodiments include apparatuses, systems, devices, hardware, methods, and combinations for airfoils and turbomachinery. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
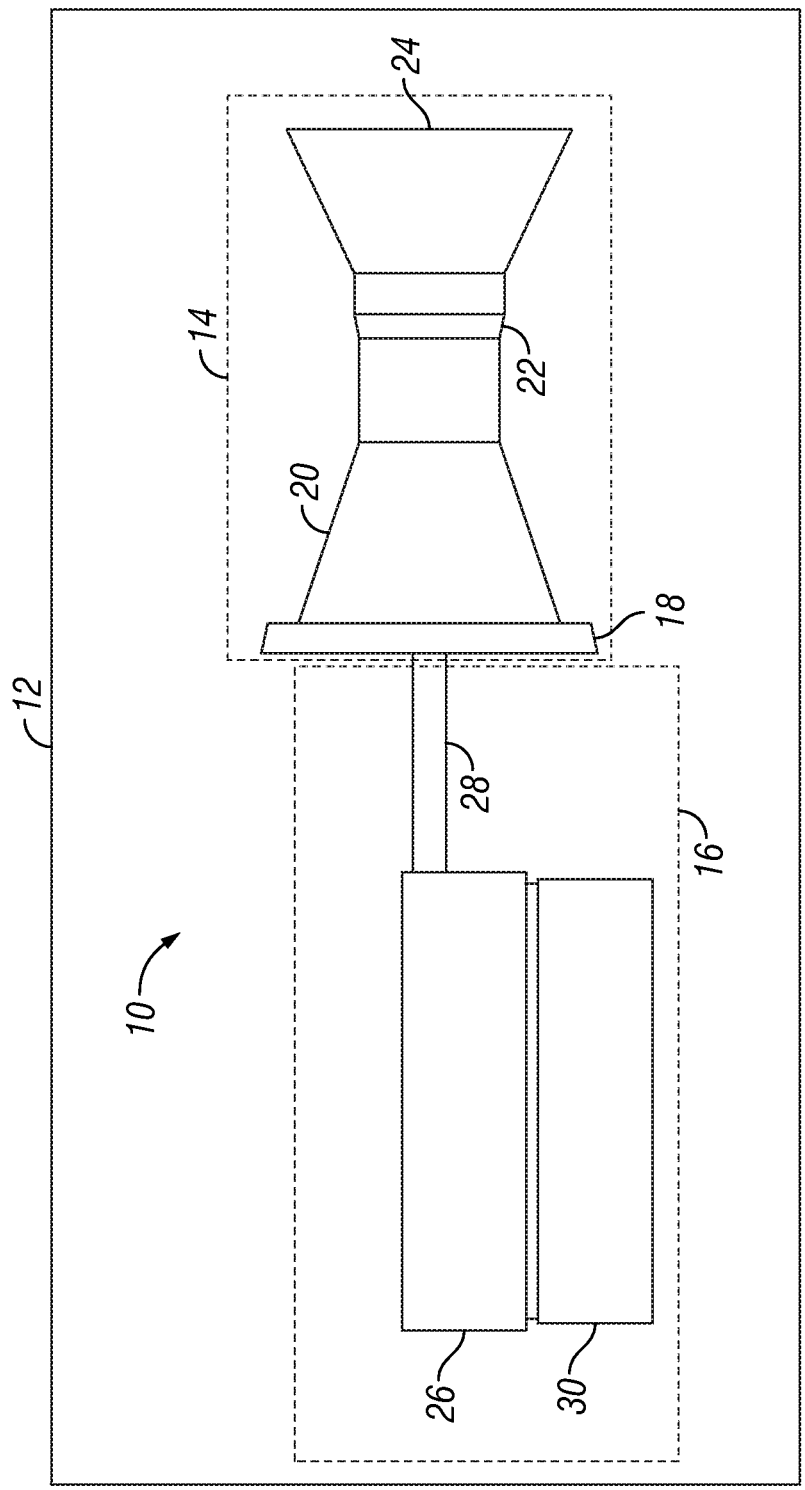
FIG. 1 schematically illustrates some aspects of a non-limiting example of a lift engine system in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to the drawings, and in particular FIG. 1, there are illustrated some aspects of a non-limiting example of a lift engine system 10 in accordance with an embodiment of the present invention. Lift engine system 10 is configured to provide propulsive thrust for an aircraft 12, such as a short takeoff and vertical landing (STOVL) aircraft. Lift engine system 10 includes turbomachinery in the form of a gas turbine engine 14 and a lift fan system 16. In other embodiments, gas turbine engine 14 may be employed without lift fan system 16 as a propulsion engine for one or more various types of aircraft. In still other embodiments, gas turbine engine 14 may be any gas turbine engine, e.g., adapted for use as an aerospace engine, a marine engine, an industrial engine or the like, and may be in the form of a turbofan engine, a turboshaft engine, a turboprop engine, a turbojet engine or a hybrid engine.

In one form, gas turbine engine 14 includes a fan 18, a compressor 20, a combustor 22 and a turbine 24. Lift fan system 16 includes a lift fan 26, a shaft system 28, and a lift thrust output system in the form of a vanebox 30. In various embodiments, fan 18, compressor 20 and turbine 24 may include one or more rotors, each of which may have one or more blade stages and vane stages. The number of rotors and stages for each of fan 18, compressor 20 and turbine 24 may vary with the needs of the particular application. Lift fan 26 is coupled to gas turbine engine 14 via shaft system 28.

Fan 18 is configured to pressurize air received at the inlet of engine 14. Compressor 20 is in fluid communication with fan 18, and is configured to compress air discharged by fan 18. Combustor 22 is in fluid communication with compressor 20, and is configured to receive the air discharged by compressor, add fuel, and combust an air fuel mixture. Turbine 24 is in fluid communication with combustor 22, and is configured to receive the hot gases exiting combustor 22, and to extract energy therefrom to power fan 18, compressor 20 and lift fan 26 via one or more shafts (not shown). Turbine 24 may also be configured to provide power for other components (not shown). Power is supplied from gas turbine engine 14 to lift fan 26 via shaft system 28. Lift fan 26 is adapted for mounting to aircraft 12, and discharges air through vanebox 30 to provide thrust e.g., for STOVL aircraft 12, which in some embodiments may be vectored thrust.

Gas turbine engine 14 and lift fan system 16 employ many airfoils in the form of blades and vanes in order to pressurize, expand and/or direct the flow of air and/or combustion products in and through engine 14 and lift fan system 16. The airfoils are used in fan 18, compressor 20, turbine 24, lift fan 26 and vanebox 30. It is often desirable that the airfoils be light in weight in order to manage the weight of engine 14 and system 16. In addition, in many cases, it is desirable that the airfoils be robust for operational purposes, but also less prone to damage downstream components should an airfoil separate from its mounting structure and pass through downstream components of part or all of engine 14 and/or lift fan system 16. Accordingly, embodiments of the present invention envision airfoils having a foam core, such as a metal foam core, with a composite skin surrounding the foam core. Such an airfoil may weigh less than conventional solid metal or hollow metal airfoils.

Figure 2:
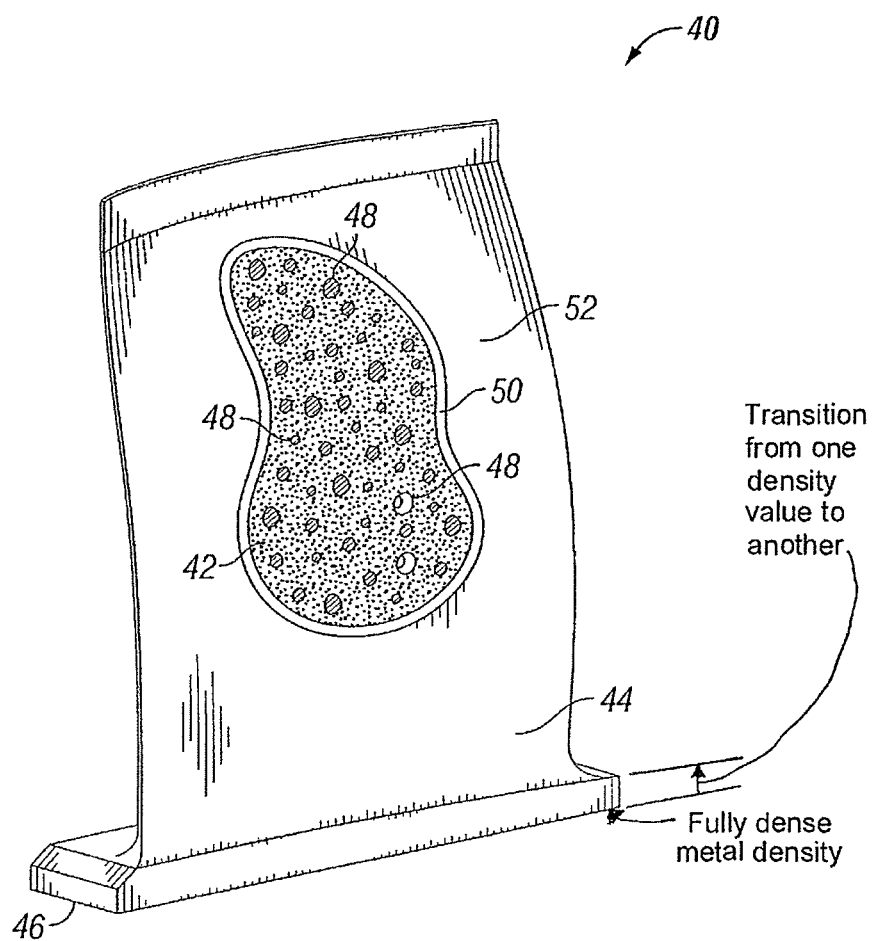
FIG. 2 illustrates some aspects of a non-limiting example of an airfoil in accordance with an embodiment of the present invention.

Referring to FIG. 2, some aspects of a non-limiting example of an airfoil 40 in accordance with an embodiment of the present invention is depicted. Airfoil 40 includes a metal foam core 42 and a composite skin 44 disposed over metal foam core 42, forming an airfoil shape. A portion of composite skin 44 is removed in the illustration of FIG. 2 in order to illustrate aspects of metal foam core 42 and composite skin 44. In one form, metal foam core 42 is 10% dense, that is, 10% of the density of a solid metal formed of the same material. In other embodiments, other density values may be employed. The type of metal used in metal foam core 42 may vary with the needs of the application. In one form, metal foam core 42 is formed of a titanium alloy. In other embodiments, other metals, alloyed or not, may be employed, e.g., an aluminum alloy.

In one form, airfoil 40 is a fan blade adapted for use in fan 18. In other embodiments, airfoil 40 may be employed as a compressor 20 airfoil, a turbine 24 airfoil, a lift fan 26 airfoil or a vanebox 30 airfoil, and may be a blade or a vane. In one form, airfoil 40 is configured to be more readily "sliced up" by downstream components of engine 14 and/or lift fan system 16, as compared to solid or hollow metal airfoils (having on the order of 100% density of the metal) in the event the airfoil separates from its mounting and is ingested by one or more downstream components. In one form, extending from airfoil 40 is an attachment feature 46 configured to attach airfoil 40 to a fan 18 rotor (not shown).

In one form, attachment feature 46 is formed as an extension of metal foam core 42 and composite skin 44. In various such embodiments, attachment feature 46 may have a different metal density than metal foam core 42, e.g., may be fully dense or may transition from one density value to another with increasing proximity to metal foam core 42. In other embodiments, attachment feature 46 may be formed separately and affixed to airfoil 40 using any suitable bonding or other material joining technique.

In one form, metal foam core 42 is a closed-cell foam. In other embodiments, metal foam core 42 may be an open-cell foam or a combination of open-cell foam and closed-cell foam. In one form, metal foam core 42 is formed as an airfoil shape (except attachment feature 46). In other embodiments, metal foam core 42 may be formed as another shape, and subsequently machined or otherwise processed into an airfoil shape.

Metal foam core 42 includes a plurality of outermost voids 48. In one form, voids 48 are formed as part of the foam structure of metal foam core 42. In other embodiments, voids 48 may be formed in metal foam core 42 subsequent to metal foam core 42 being formed. In one form, composite skin 44 includes a composite material layer 50 that extends into and at least partially fills some or all of outermost voids 48, affixing composite skin 44 to metal foam core 42. Bonding agents may or may not be used to increase the bond strength, depending upon the application. In one form, composite material 50 is a polyamide material. In other embodiments, other composite materials may be employed, e.g., depending upon mechanical, thermal and/or aerodynamic loading, and/or ambient conditions at the location in engine 14 and/or lift fan system 16 where airfoil 40 is intended to operate. In one form, composite material layer 50 is glass-filled. In other embodiments, composite material layer 50 may employ other fillers in addition to or in place of glass. In still other embodiments, composite material layer 50 may not employ any fillers.

In one form, composite skin 44 includes another composite material layer 52 overlaying composite material layer 50. In one form, composite material layer 52 is a carbon-fiber composite having a carbon fabric included therein. In other embodiments, composite material layer 52 may be one or more other types of composite materials. In one form, composite layer 52 is bonded to composite material layer 50. In one form, composite layer 52 is configured to reinforce composite material layer 50. In other embodiments, composite material layer 52 may also or alternatively be configured otherwise. For example and without limitation, composite material layer 52 may be configured for erosion and/or corrosion protection. Although described herein as being bonded to composite material layer 50, in other embodiments, composite material layer 52 may be bonded directly to metal foam core 42. For example, some embodiments may include composite layer 52 as part of composite skin 44, but without also having composite layer 50 as part of composite skin 44.

Airfoil 40 may be manufactured by forming a metal foam core 42 into an airfoil shape. For example and without limitation, metal foam may be formed into an airfoil via the use of a mold, may be formed into a rough shape and subsequently machined or otherwise processed into an airfoil shape, or may be formed into an airfoil shape via a freeform manufacturing technique, such as a stereolithography technique. In other embodiments, metal foam core may not have an airfoil shape or a complete airfoil shape, in which case composite skin 44 may be used to form the airfoil shape. Metal foam core 42 is manufactured to include outermost voids 48.

After metal foam core 42 is formed into an airfoil shape, composite skin 44 is affixed to metal foam core 42. Composite material layer 50 is formed by directing composite material, e.g., polyamide, into outermost voids 48, at least partially filling voids 68, and thereby affixing composite skin 44 to metal foam core 42. In various embodiments, only some of voids 48 are filled or partially filled, e.g., depending on the size of the void. In one form, the composite material is injection molded into voids 48. In other embodiments, other techniques may be employed to direct the composite material of composite layer 50 into outermost voids 48. Composite material layer 50 may be filled (e.g. glass-filled) or may be unfilled. In one form, composite layer 52, e.g., a carbon fiber composite, is formed and bonded onto composite material layer 50. In various other embodiments, composite layer 52 may not be employed, or may be bonded or otherwise affixed to metal foam core 42.

Figure 3:
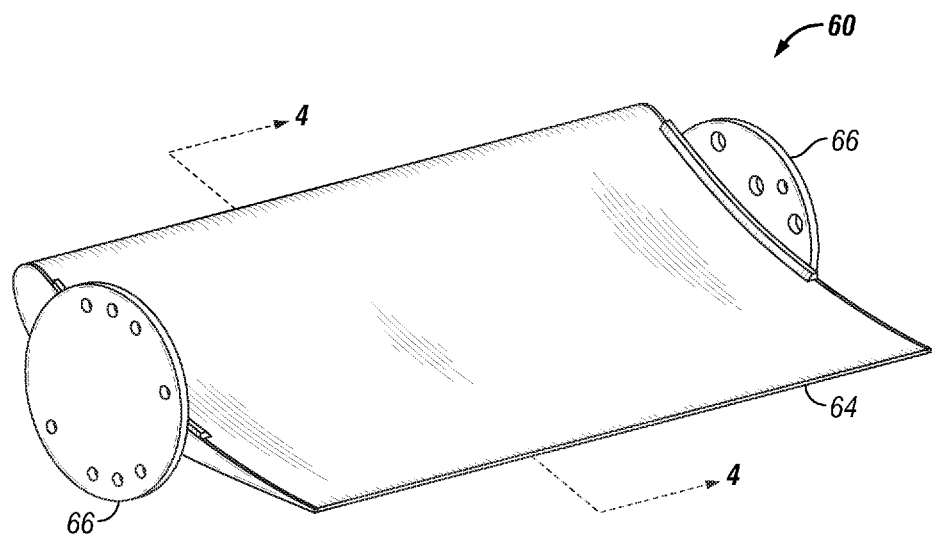
FIGS. 3 and 4 illustrate some aspects of a non-limiting example of an airfoil in accordance with an embodiment of the present invention.
Figure 4:
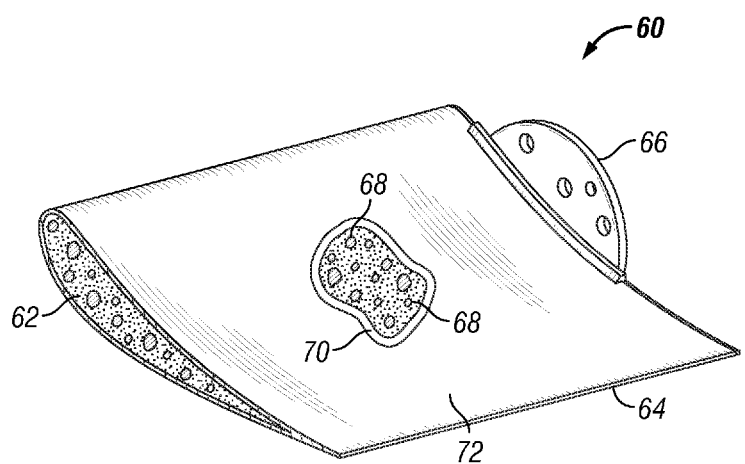

Referring to FIGS. 3 and 4 some aspects of a non-limiting example of an airfoil 60 in accordance with an embodiment of the present invention is depicted. Airfoil 60 includes a metal foam core 62 and a composite skin 64 disposed over metal foam core 62, forming an airfoil shape. A portion of composite skin 64 is removed in the illustration of FIG. 4 in order to illustrate aspects of metal foam core 62 and composite skin 64. In one form, metal foam core 62 is 10% dense. In other embodiments, other density values may be employed. The type of metal used in metal foam core 42 may vary with the needs of the application. In one form, metal foam core 42 is formed of a titanium alloy. In other embodiments, other metals, alloyed or not, may be employed, e.g., an aluminum alloy.

In one form, airfoil 60 is configured as a vane that is configured for use in vanebox 30. In other embodiments, airfoil 60 may be employed as a compressor 20 airfoil, a turbine 24 airfoil, a lift fan 26 airfoil, and may be a blade or a vane. In one form, extending from airfoil 60 is an attachment feature 66 configured to attach airfoil 60 to vanebox 30. In one form, attachment feature 66 is formed separately and affixed to airfoil 60, e.g., using a suitable bonding or other material joining technique. In other embodiments, attachment feature 66 may be formed as an extension of metal foam core 62 and composite skin 64. In such embodiments, attachment feature 66 may have a different metal density than the metal foam 62, e.g., may be fully dense or may transition from one density value to another with increasing proximity to metal foam core 62. In one form, metal foam core 62 is a closed-cell foam. In other embodiments, metal foam core 62 may be an open-cell foam or a combination of open-cell foam and closed-cell foam. In one form, metal foam core 62 is formed as an airfoil shape (except attachment feature 46). In other embodiments, metal foam core 62 may be formed as another shape, and subsequently machined or otherwise processed into an airfoil shape.

Metal foam core 62 includes a plurality of outermost voids 68. In one form, voids 68 are formed as part of the foam structure of metal foam core 62. In other embodiments, voids 68 may be formed in metal foam core 62 subsequent to metal foam core 62 being formed. In one form, composite skin 64 includes a composite material layer 70 that extends into and at least partially fills some or all of outermost voids 68, affixing composite skin 64 to metal foam core 62. Bonding agents may or may not be used to increase the bond strength, depending upon the application. In one form, composite material 70 is a polyamide material. In other embodiments, other composite materials may be employed, e.g., depending upon mechanical, thermal and/or aerodynamic loading, and/or ambient conditions at the location in engine 14 and/or lift fan system 16 where airfoil 60 is intended to operate. In one form, composite material layer 70 is glass-filled. In other embodiments, composite material layer 70 may employ other fillers in addition to or in place of glass. In still other embodiments, composite material layer 70 may not employ any fillers.

In one form, composite skin 64 includes another composite material layer 72 overlaying composite material layer 70. In one form, composite material layer 72 includes a carbon fabric in a carbon-fiber composite. In other embodiments, composite material layer 72 may be one or more other types of composite materials. In one form, composite layer 72 is bonded to composite material layer 70. In one form, composite layer 72 is configured to reinforce composite material layer 70. In other embodiments, composite material layer 72 may also or alternatively be configured otherwise. For example and without limitation, composite material layer 72 may be configured for erosion and/or corrosion protection. Although described herein as being bonded to composite material layer 70, in other embodiments, composite material layer 72 may be bonded directly to metal foam core 62. For example, some embodiments may include composite layer 72 as part of composite skin 64, but without also having composite layer 70 as part of composite skin 64.

In one form, airfoil 60 may be manufactured in the same manner set forth above with respect to airfoil 40. In other embodiments, airfoil 60 may be manufactured using other processes and techniques.

Embodiments of the present invention include an airfoil for a turbomachine, comprising: a metal foam core; and a composite skin disposed over the metal foam core and forming an airfoil shape.

In a refinement, the composite skin includes a carbon fiber composite.

In another refinement, the carbon fiber composite includes a carbon fabric.

In yet another refinement, the metal foam core has a plurality of outermost voids, and the composite skin includes a first composite material extending into and at least partially filling at least some of the plurality of outermost voids.

In still another refinement, the composite skin includes a second composite material overlaying the first composite material.

In yet still another refinement, the second composite material is a carbon fiber composite.

In an additional refinement, the second composite material is bonded to the first composite material.

In a further refinement, the first composite material includes a polyamide.

In a yet further refinement, the polyamide is glass filled.

In a still further refinement, the turbomachine is a vanebox, and the airfoil is a vane configured for use in the vanebox.

In a yet still further refinement, the airfoil further comprises at least one attachment feature configured to attach the airfoil to a component of the turbomachine.

Embodiments of the present invention include a gas turbine engine, comprising: at least one of a fan and a compressor; a combustor in fluid communication with the compressor; and a turbine in fluid communication with the combustor, wherein at least one of the fan, compressor and the turbine include an airfoil having a metal foam core and a composite skin disposed over the metal foam core.

In a refinement, the airfoil is a fan blade.

In another refinement, the metal foam core has an airfoil shape.

In yet another refinement, the metal foam core is a closed-cell foam.

In still another refinement, the composite skin includes a first composite material reinforced by a second composite material.

In yet still another refinement, the first composite material is a polyamide material.

In an additional refinement, the second composite material includes a carbon fabric.

In a further refinement, the airfoil is configured as a vane.

Embodiments of the present invention include a method for manufacturing an airfoil for a turbomachine, comprising: forming a metal foam core into an airfoil shape; and affixing a composite skin to the metal foam core.

In a refinement, the metal foam core is formed to include a plurality of outermost voids, and wherein the composite skin is formed at least in part by injection molding a composite material into at least some of the plurality of outermost voids.

In another refinement, the method further comprises bonding a carbon fiber composite to the composite material.

In yet another refinement, the metal foam core is machined into an airfoil shape.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An airfoil for a turbomachine, comprising:
a metal foam core formed into an airfoil shape, the metal form core including a closed-cell foam, an open-cell foam, or a combination of open-cell foam and closed-cell foam;
a composite skin formed from a fabric disposed over the metal foam core and forming an external surface of the airfoil shape; and
an attachment feature extending from the metal foam core, wherein the attachment feature includes a blade root or a flat disk, wherein the attachment feature includes a metal foam having a higher density than a density of the metal foam core;
wherein the metal foam core has a plurality of outermost voids, and wherein the composite skin includes a first composite material extending into and at least partially filling at least some of the plurality of outermost voids;

wherein the first composite material includes a polyamide; and wherein the polyamide material extends into the outermost voids to at least partially fill the outermost voids.

2. The airfoil of claim 1, wherein the composite skin includes a carbon fiber composite.

3. The airfoil of claim 2, wherein the carbon fiber composite includes a carbon fabric.

4. The airfoil of claim 1, wherein the composite skin includes a second composite material overlaying the first composite material.

5. The airfoil of claim 4, wherein the second composite material is a carbon fiber composite.

6. The airfoil of claim 4, wherein the second composite material is bonded to the first composite material.

7. The airfoil of claim 1, wherein the polyamide is glass filled.

8. The airfoil of claim 1, wherein the turbomachine is a vanebox, and wherein the airfoil is a vane configured for use in the vanebox.

9. A gas turbine engine, comprising:

at least one of a fan and a compressor;

a combustor in fluid communication with the compressor;

a turbine in fluid communication with the combustor, wherein at least one of the fan, compressor and the turbine include an airfoil having a metal foam core formed in an airfoil shape and a composite skin formed from a fabric disposed over the metal foam core; and an attachment feature extending from the metal foam core, wherein the attachment feature includes a blade root or a flat disk, wherein the attachment feature includes a metal foam having a higher density than a density of the metal foam core;

wherein the metal foam core has a plurality of outermost voids, and the composite skin includes a first composite material comprising a polyamide material that extends into the outermost voids to at least partially fill the outermost voids.

10. The gas turbine engine of claim 9, wherein the airfoil is a fan blade.

11. The gas turbine engine of claim 9, wherein the metal foam core is a closed-cell foam.

12. The gas turbine engine of claim 9, wherein the composite skin includes a second composite material, and wherein the first composite material is reinforced by the second composite material.

13. The gas turbine engine of claim 12, wherein the second composite material includes a carbon fabric.

14. The gas turbine engine of claim 9, wherein the airfoil is configured as a vane.

15. A method for manufacturing an airfoil for a turbomachine, comprising:

forming a metal foam core into an airfoil shape;

affixing a composite skin formed from a fabric to the metal foam core; and forming an attachment feature extending from the metal foam core, wherein the attachment feature includes a blade root or a flat disk, wherein the attachment feature includes a metal foam having a higher density than a density of the metal foam core;

wherein the metal foam core is formed to include a plurality of outermost voids, and wherein the composite skin is formed at least in part to include a composite material comprising a polyamide material that extends into at least some of the plurality of outermost voids.

16. The method of claim 15, wherein the composite skin is formed at least in part by injection molding the polyamide material into at least some of the plurality of outermost voids.

17. The method of claim 16, further comprising bonding a carbon fiber composite to the composite material.

18. The method of claim 15, wherein the metal foam core is machined into an airfoil shape.

\* \* \* \* \*

UNITED STATES PATENT AND TRADEMARK OFFICE
CERTIFICATE OF CORRECTION

PATENT NO. : 9,004,873 B2  
APPLICATION NO. : 12/978860  
DATED : April 14, 2015  
INVENTOR(S) : Edward Claude Rice Page 1 of 1

It is certified that error appears in the above-identified patent and that said Letters Patent is hereby corrected as shown below:

In the Claims:

Column 6, line 55 should read:

1. An airfoil for a turbomachine, comprising:  
    a metal foam core formed into an airfoil shape, the metal  
        foam core including a closed-cell foam, an open-cell  
        foam, or a combination of open-cell foam and closed-  
        cell foam;

Signed and Sealed this  
Second Day of August, 2016

Michelle K. Lee  
*Director of the United States Patent and Trademark Office*